(12) United States Patent
Crevenat et al.

(10) Patent No.: US 12,597,540 B2
(45) Date of Patent: Apr. 7, 2026

(54) OVERVOLTAGE PROTECTION DEVICE AND METHOD OF MANUFACTURING SUCH A DEVICE

(71) Applicant: CITEL, Sevres Cedex (FR)

(72) Inventors: Vincent Crevenat, Reims (FR); Vincent Lapauw, Reims (FR)

(73) Assignee: CITEL, Sevres Cedex (FR)

( * ) Notice: Subject to any disclaimer, the term of this patent is extended or adjusted under 35 U.S.C. 154(b) by 465 days.

(21) Appl. No.: 18/372,326

(22) Filed: Sep. 25, 2023

(65) Prior Publication Data

US 2024/0113518 A1 Apr. 4, 2024

(30) Foreign Application Priority Data

Sep. 29, 2022 (FR) ....................................... 2209926

(51) Int. Cl.
| | |
|---|---|
| *H01C 7/12* | (2006.01) |
| *H02H 5/04* | (2006.01) |
| *H02H 9/04* | (2006.01) |

(52) U.S. Cl.
CPC .............. *H01C 7/126* (2013.01); *H02H 5/04* (2013.01); *H02H 9/041* (2013.01)

(58) Field of Classification Search
CPC ........ H01H 9/30; H01H 9/32; H01H 85/0039; H01H 2085/381; H01C 7/12; H01C 7/126; H02H 9/04–048; H02H 5/04
See application file for complete search history.

(56) References Cited

U.S. PATENT DOCUMENTS

| | | | | |
|---|---|---|---|---|
| 6,430,019 | B1 * | 8/2002 | Martenson ............. | H01C 7/126 361/103 |
| 10,056,217 | B2 | 8/2018 | Crevenat et al. | |
| 2018/0138697 | A1 * | 5/2018 | Crevenat ............... | H01H 83/10 |
| 2020/0335964 | A1 * | 10/2020 | Zhang ................... | H01C 7/108 |

FOREIGN PATENT DOCUMENTS

| | | | |
|---|---|---|---|
| CN | 216699478 | U | 6/2022 |
| DE | 102020121590 | A1 | 3/2021 |
| EP | 2038972 | A1 | 3/2009 |
| EP | 3244504 | A1 | 11/2017 |
| EP | 3319194 | A1 | 5/2018 |
| WO | 2008003274 | A1 | 1/2008 |

OTHER PUBLICATIONS

French Search Report with English translation and Written Opinion for FR2209926 mailed Apr. 26, 2023.

* cited by examiner

*Primary Examiner* — Thienvu V Tran
*Assistant Examiner* — Christopher J Clark
(74) *Attorney, Agent, or Firm* — Notaro, Michalos & Zaccaria P.C.

(57) ABSTRACT

A method of manufacturing an overvoltage protection device and a protection device obtained via the method are described. The method includes the steps of (1) electrically connecting a first electrode of a first protection element to a first electrode of a second protection element via a heat-sensitive disconnector device, (2) procuring a pre-assembled arc-extinguishing device that has a cassette, an insulating blade mobile inside the cassette, and at least one elastic element, and (3) moving the arc-extinguishing device until it reaches a final mounting position in which the heat-sensitive disconnector device bears against the insulating blade and pushes the insulating blade in the direction of a retracted position.

11 Claims, 10 Drawing Sheets

OVERVOLTAGE PROTECTION DEVICE AND METHOD OF MANUFACTURING SUCH A DEVICE

CROSS REFERENCE TO RELATED APPLICATION

This patent application claims the benefit and priority of French Patent Application No. 2209926, filed on Sep. 29, 2022, the disclosure of which is incorporated by reference herein in its entirety as part of the present disclosure.

TECHNICAL FIELD

The invention relates to the field of devices protecting against overvoltages.

The invention relates in particular to overvoltage protection devices including: —on the one hand, a heat-sensitive disconnector device which, in a connected state, electrically connects at least two electrodes each being part of a respective protection element and is able to pass, in the event of overheating of one of the protection elements, to a disconnected state in which it no longer provides the electrical connection between the two electrodes, and—on the other hand, an arc-extinguishing device that includes an insulating blade that is adapted to be inserted between the two electrodes when the heat-sensitive disconnector device is in the disconnected state, which enables prevention of electrical arcing between said electrodes.

TECHNOLOGICAL BACKGROUND

It is known to use overvoltage protection devices to protect electrical equipment against transient overvoltages that may have different causes, such as lightning or industrial interference, for example.

Overvoltage protection devices are intended to be disposed upstream of and in parallel with the equipment to be protected. They use protection elements such as varistors or gas-filled spark gaps, for example, which have the particular feature of having a high impedance in the normal state and becoming conductive if they are subjected to an overvoltage above a certain threshold, which is above the normal operating voltage of the equipment to be protected. The protection elements thus enable overvoltages to be shunted.

The document EP3244504 discloses an overvoltage protection device of the above kind that also assures total disconnection of the protection elements at their end of life. The latter device includes a varistor, a gas-filled spark gap, thermofusible solder that electrically connects an electrode of the spark gap and an electrode of the varistor and a return member that exerts a return force tending to move the varistor and the spark gap away from each other so that, if an overvoltage on the varistor and the spark gap causes heating thereof above a temperature threshold so that the thermofusible solder melts, the aforementioned electrodes are separated from one another. The overvoltage protection device also includes an arc-extinguishing device that includes an insulating blade that rotates on the casing of the protection device and a torsion spring that forces the insulating blade against the thermofusible solder so that when the latter melts said insulating blade is positioned between the spark gap and varistor, thus preventing electrical arcing.

An overvoltage protection device of this kind is not entirely satisfactory. In particular, assembling the arc-extinguishing device onto the casing is difficult. Furthermore, the design of this protection device necessitates fitting the arc-extinguishing device before carrying out the operations of connecting the various components of the protection device to one another. Also, the insulating blade of the arc-extinguishing device loads the thermofusible solder during soldering operations or failing this must be held in position during these operations, which makes them even more difficult.

SUMMARY OF THE INVENTION

Accordingly, one idea behind the invention is to propose an overvoltage protection device equipped with an arc-extinguishing device that is simple to manufacture.

In accordance with one embodiment the invention provides a method of manufacturing an overvoltage protection device including the following steps:

procuring at least one first protection element and one second protection element each including a first electrode and a second electrode, electrically connecting the first electrode of the first protection element to the first electrode of the second protection element by means of a heat-sensitive disconnector device, the heat-sensitive disconnector device being able to pass, if said heat-sensitive disconnector device is subjected to a temperature above a threshold, from a connected state to a disconnected state in which the first electrode of the first protection element and the first electrode of the second protection element are disconnected from one another, procuring a pre-assembled arc-extinguishing device comprising a cassette, an insulating blade mobile inside the cassette between a retracted position and a deployed position, and at least one return elastic element that is adapted to urge said insulating blade relative to the cassette in the direction of the deployed position, moving the arc-extinguishing device relative to the first and second protection elements and to the heat-sensitive disconnector device until a final mounting position is reached in which the heat-sensitive disconnector device bears against the insulating blade and pushes said insulating blade in the direction of the retracted position, the insulating blade being, in said final mounting position of the arc-extinguishing device, adapted to be moved relative to the cassette toward the deployed position and to be introduced between the first electrodes of the first and second protection elements when the heat-sensitive disconnector device goes to the disconnected state.

Thus presentation of the arc-extinguishing device in a pre-assembled form facilitates manufacture of the protection device. In particular, this makes it possible for the arc-extinguishing device to be positioned relative to first and second protection elements only after the operations of connecting the first and second protection elements by means of the heat-sensitive disconnector device, which facilitates the operations involved in the manufacture of the heat-sensitive disconnector device.

Embodiments of a manufacturing method of this kind may have one or more of the following features.

In accordance with one embodiment the elastic element is also accommodated inside the cassette.

In accordance with one embodiment the second electrode of the first protection element and the second electrode of the second protection element are each electrically connected to a connecting terminal.

In accordance with one embodiment there are mounted in a casing the first protection element, the second protection element and the arc-extinguishing device in the final mounting position.

In accordance with one embodiment the casing includes a base and a cap.

In accordance with one embodiment the casing is configured to be fixed onto a fixing rail.

In accordance with one embodiment the cassette includes slideways and during movement of the arc-extinguishing device relative to the first and second protection elements and to the heat-sensitive disconnector device the projecting portions of the first electrode of the first protection element and of the first electrode of the second protection element slide in the slideways of the cassette.

Accordingly, the slideways have, on the one hand, a function of guiding the movement of the arc-extinguishing device relative to the first and second protection elements that facilitates positioning the arc-extinguishing device and, on the other hand, therefore allow the cassette of the arc-extinguishing device to assure a function of stiffening of the connections between the first and second protection elements.

In accordance with one embodiment the insulating blade is mounted to slide inside the cassette between the retracted position and the deployed position in a direction that is parallel to the slideways.

In accordance with one embodiment the invention also provides an overvoltage protection device capable of being obtained by the aforementioned method and including:

at least one first protection element and one second protection element each including a first electrode and a second electrode, the first electrode of the first protection element and the first electrode of the second protection element being connected by means of a heat-sensitive disconnector device, the heat-sensitive disconnector device being able to pass, if said heat-sensitive disconnector device is subjected to a temperature exceeding a threshold, from a connected state to a disconnected state in which the first electrode of the first protection element and the first electrode of the second protection element are disconnected from one another;

a pre-assembled arc-extinguishing device comprising a cassette, an insulating blade mobile inside the cassette between a retracted position and a deployed position, and at least one return elastic element that is adapted to urge said insulating blade relative to the cassette in the direction of the deployed position, said arc-extinguishing device being positioned relative to the first and second protection elements and to the heat-sensitive disconnector device in such a manner that the insulating blade bears against the heat-sensitive disconnector device and is retained by the latter in the retracted position, said insulating blade being configured to move relative to the cassette toward the deployed position and to be introduced between the first electrodes of the first and second protection elements if the heat-sensitive disconnector device goes to the disconnected state.

In accordance with one embodiment the cassette includes slideways in which are accommodated projecting portions of the first electrode of the first protection element and of the first electrode of the second protection element.

In accordance with one embodiment the arc-extinguishing device includes an abutment intended to stop the movement of the insulating blade in the deployed position. The abutment therefore makes it possible to prevent the insulating blade from escaping from the cassette before the arc-extinguishing device is assembled with the other components of the protection device.

In accordance with one embodiment the abutment is formed by a switch intended to be electrically connected to a remote signaling device. Thus the arc-extinguishing device also incorporates some of the elements providing the remote signaling functionality.

In accordance with one embodiment the first protection element and the second protection element are respectively first and second varistors extending parallel to one another.

In accordance with one embodiment the first varistor and the second varistor include a body, the projecting portions projecting beyond the body, on either side of each of said first and second varistors, along two opposite edges of said first and second varistors.

In accordance with one embodiment the protection device further comprises a third protection element including a first electrode and a second electrode, the first electrode of the third protection element being connected to the first electrode of the first protection element and to the first electrode of the second protection element by the heat-sensitive disconnector device.

In accordance with one embodiment the second electrode of the third protection element is electrically connected to a connecting terminal.

In accordance with one embodiment the cassette includes slideways in which are accommodated projecting portions of the first electrode of the third protection element. The cassette of the arc-extinguishing device therefore also assures a function of stiffening the connection of the third protection element to the first and second protection elements.

In accordance with one embodiment the third protection element is a third varistor extending below and perpendicularly to the first and second varistors. This in particular ensures compactness of the protection device.

In accordance with one embodiment the third varistor includes a body, the projecting portions projecting beyond the body of the third varistor along two opposite edges of said third varistor.

In accordance with one embodiment the third protection element is a gas-filled spark gap.

In accordance with one embodiment the first protection element and the second protection element are respectively a first varistor and a second varistor extending parallel to one another, the third protection element being a third varistor extending perpendicularly to the first and second varistors or a gas-filled spark gap.

In accordance with one embodiment the heat-sensitive disconnector device includes:

a tag which, in the connected state, is positioned between a first lug that is part of the first electrode of the first protection element and a second lug that is part of the first electrode of the second protection element, said tag being fixed to the first lug and to the second lug by a thermofusible connection, and a braided cable having a first end connected to the tag and a second end electrically connected to the first electrode of the third protection element.

In accordance with one embodiment the thermofusible connection is made by thermofusible solder.

In accordance with one embodiment the thermofusible solder is produced using a tin alloy.

In accordance with one embodiment the cassette includes a first lateral wall and a second lateral wall that are fixed to one another, disposed on respective opposite side of the insulating blade and positioned in a gap formed between the first protection element and the second protection element, the cassette further including a first lateral flange and a second lateral flange that respectively extend from a first end of the first lateral wall and of the second lateral wall perpendicularly to said first and second lateral walls, the first lateral flange being positioned between the first protection element and the third protection element and the second lateral flange being positioned between the second protection element and the third protection element.

In accordance with one embodiment the first lateral wall and the second lateral wall each include a slot through which pass the first lug and the second lug, respectively, the cassette further including a free space between the first lateral wall and the second lateral wall through which the braided cable passes.

In accordance with one embodiment the protection device further includes a fourth protection element that includes a first electrode and a second electrode, the first electrode of the fourth protection element being electrically connected to the first electrode of the third protection element.

In accordance with one embodiment the fourth protection element is a fourth varistor that is parallel to the third varistor.

In accordance with one embodiment the second electrode of the third protection element and the second electrode of the fourth projection element are made in one piece.

In accordance with one embodiment the first electrode of the third varistor and the first electrode of the fourth varistor include bent portions that extend perpendicularly to the planes of the third and fourth varistors, project toward one another and are welded to one another in an overlap zone.

In accordance with one embodiment the arc-extinguishing device includes two elastic elements each of which is formed by a coil spring that is loaded in compression and has an end bearing against a bearing surface of the cassette and an end bearing against a bearing surface of the insulating blade.

In accordance with one embodiment the insulating blade includes centering pins over which the coil springs are threaded. This makes it possible to prevent the coil springs from moving off axis.

BRIEF DESCRIPTION OF THE FIGURES

The invention will be better understood and other aims, details, features and advantages thereof will become more clearly apparent in the course of the following description of particular embodiments of the invention given by way of non-limiting illustrative example with reference to the appended drawings.

6

Figure 2:
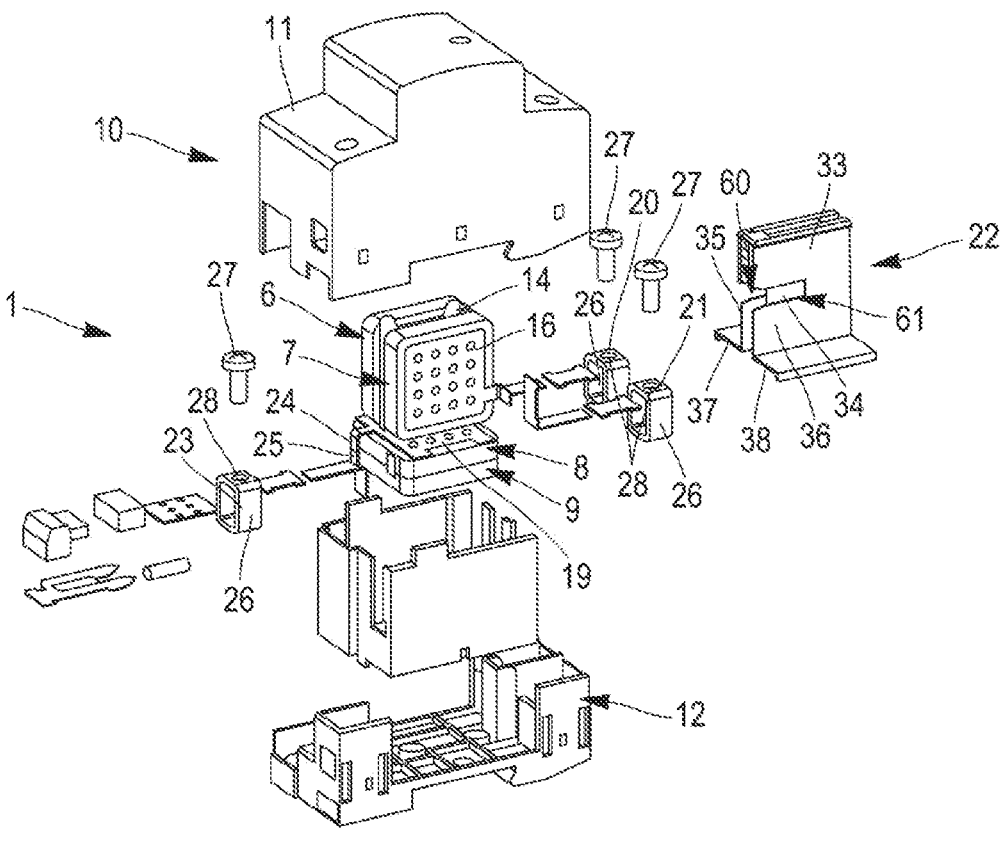
FIG. 2 is an exploded view of an overvoltage protection device having an electrical circuit conforming to that represented in FIG. 1.
Figure 6:
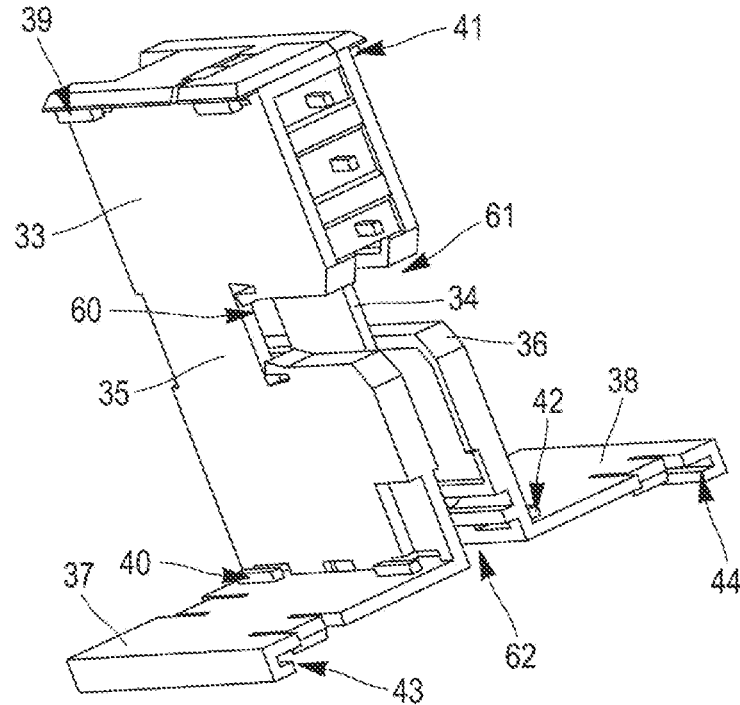

FIG. 6 is a perspective view of the arc-extinguishing device of the overvoltage protection device from FIG. 2, the insulating blade of said arc-extinguishing device being in a deployed position.

Figure 7:
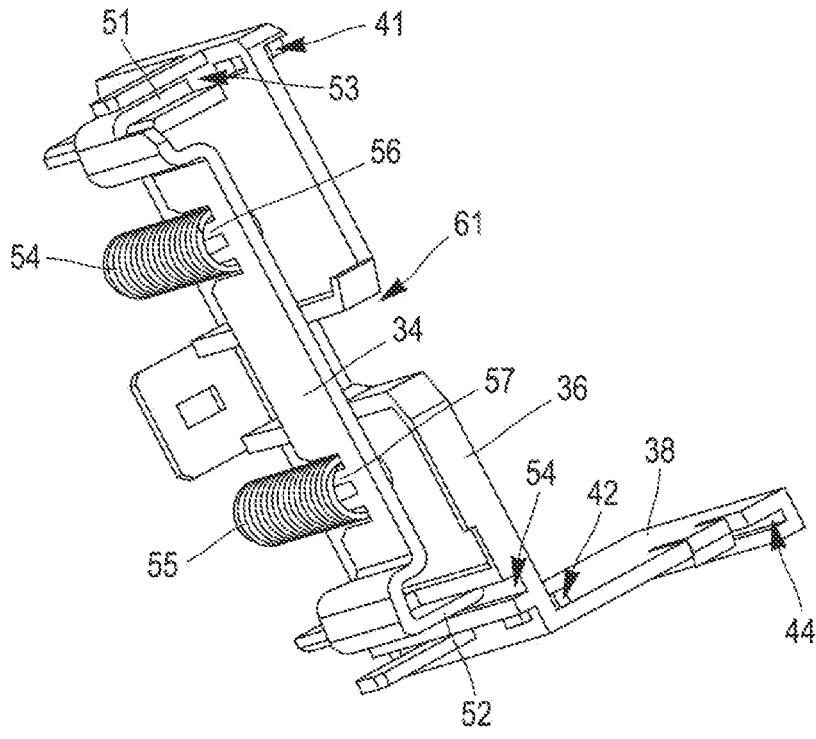

FIG. 7 is a partial perspective view of the arc-extinguishing device from FIG. 6, the insulating blade of said arc-extinguishing device being in a retracted position.

Figure 8:
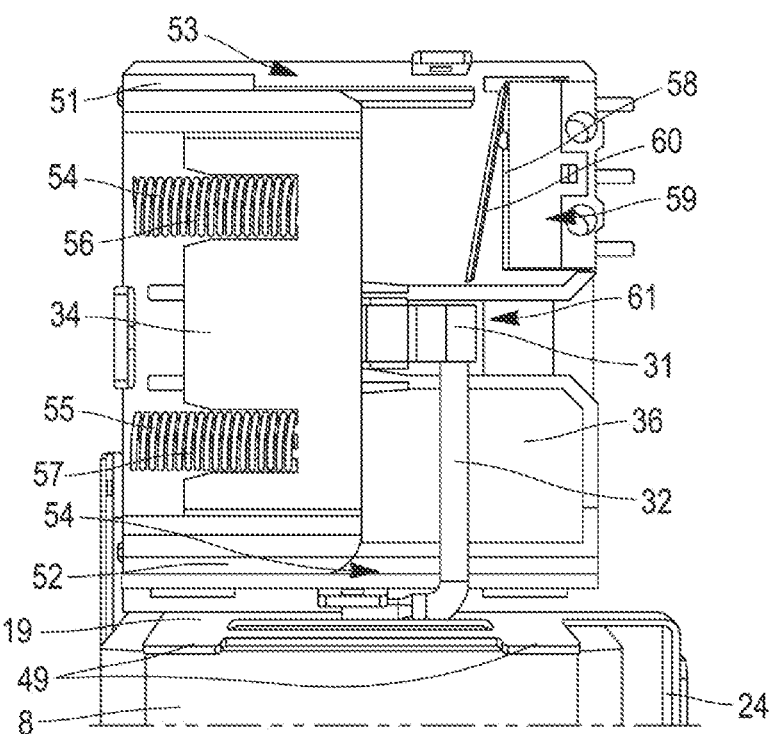

FIG. 8 is a partial side view of the arc-extinguishing device and the heat-sensitive disconnector device, the heat-sensitive disconnector device being in the connected state and the insulating blade of said arc-extinguishing device being in the retracted position.

Figure 9:
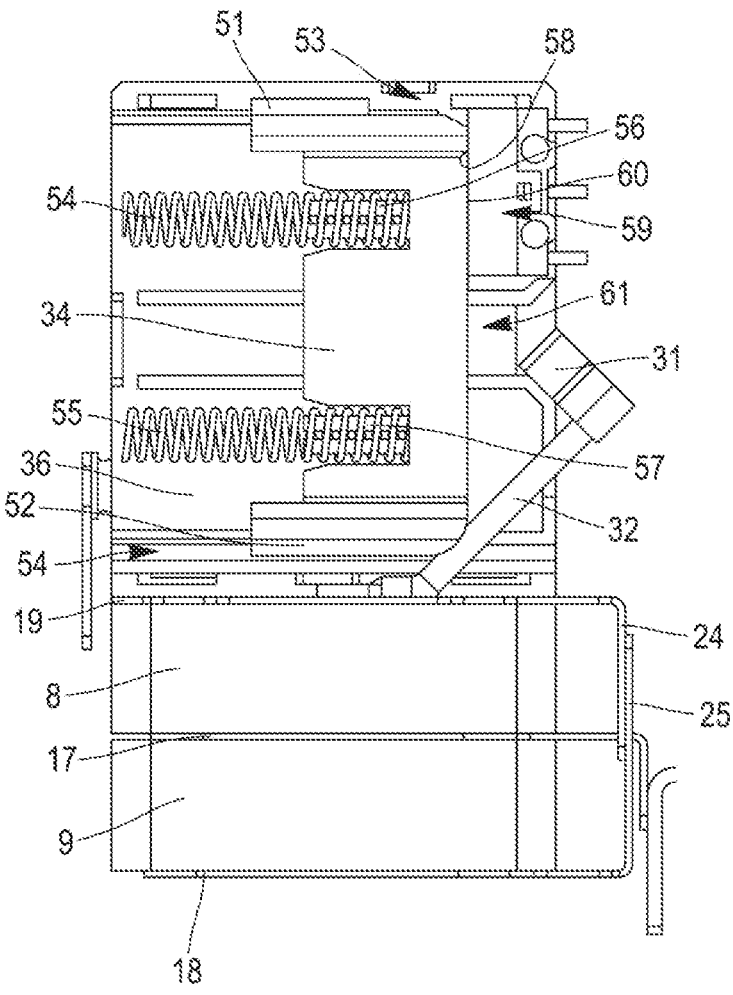

FIG. 9 is a partial side view of the arc-extinguishing device and the heat-sensitive disconnector device, the heat-sensitive disconnector device being in the disconnected state and the insulating blade of said arc-extinguishing device being in the deployed position.

Figure 10:
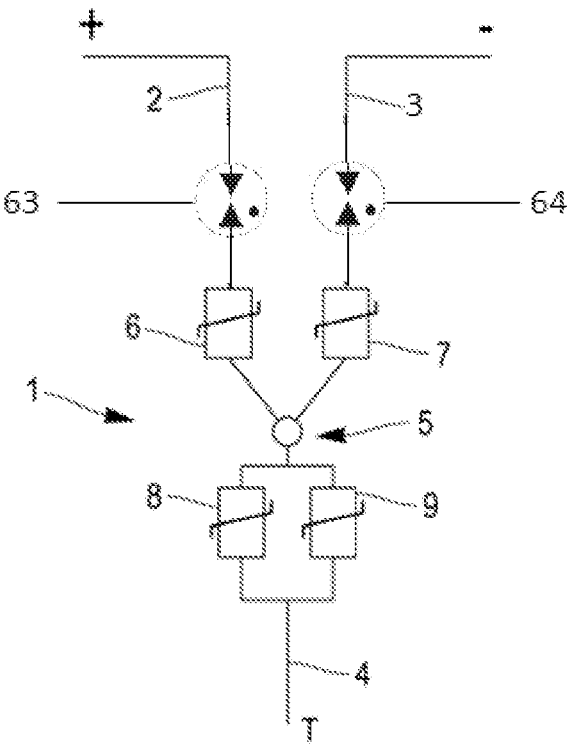

FIG. 10 is a schematic view of an electrical circuit of an overvoltage protection device in accordance with a second embodiment.

Figure 11:
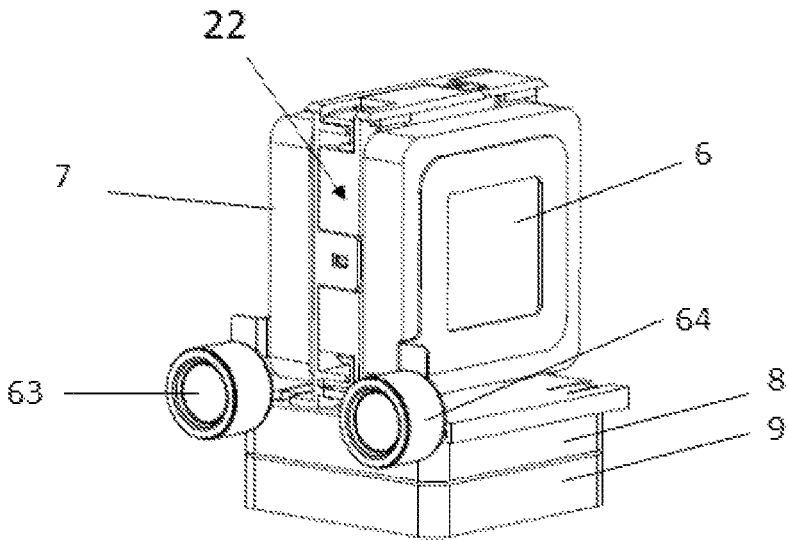

FIG. 11 is a partial perspective view of an overvoltage protection device having an electrical circuit conforming to that represented in FIG. 10.

Figure 12:
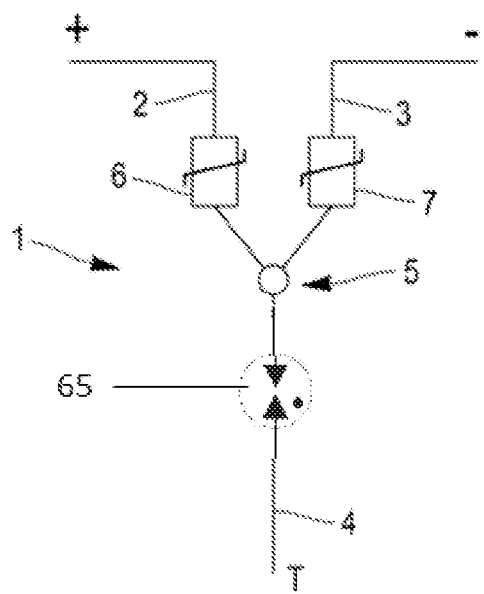

FIG. 12 is a schematic view of an electrical circuit of an overvoltage protection device in accordance with a third embodiment.

Figure 13:
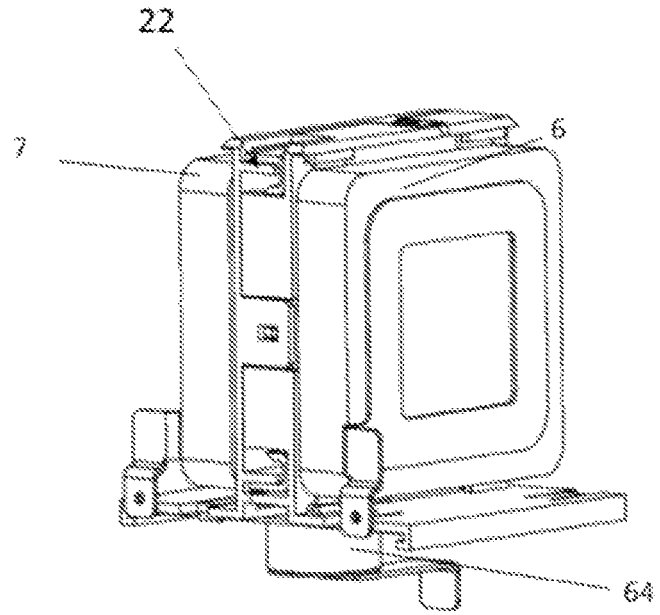

FIG. 13 is a partial perspective view of an overvoltage protection device including an electrical circuit conforming to that represented in FIG. 12.

Figure 14:
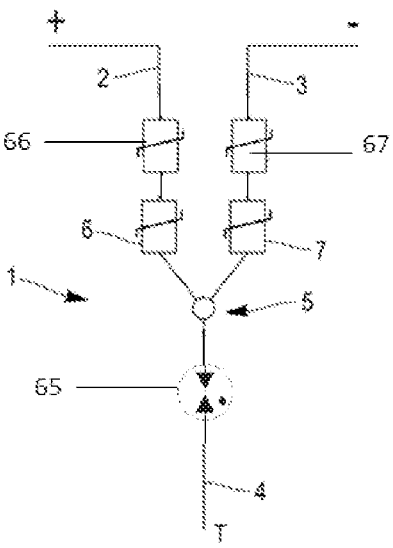

FIG. 14 is a schematic view of an electrical circuit of an overvoltage protection device in accordance with a fourth embodiment.

Figure 15:
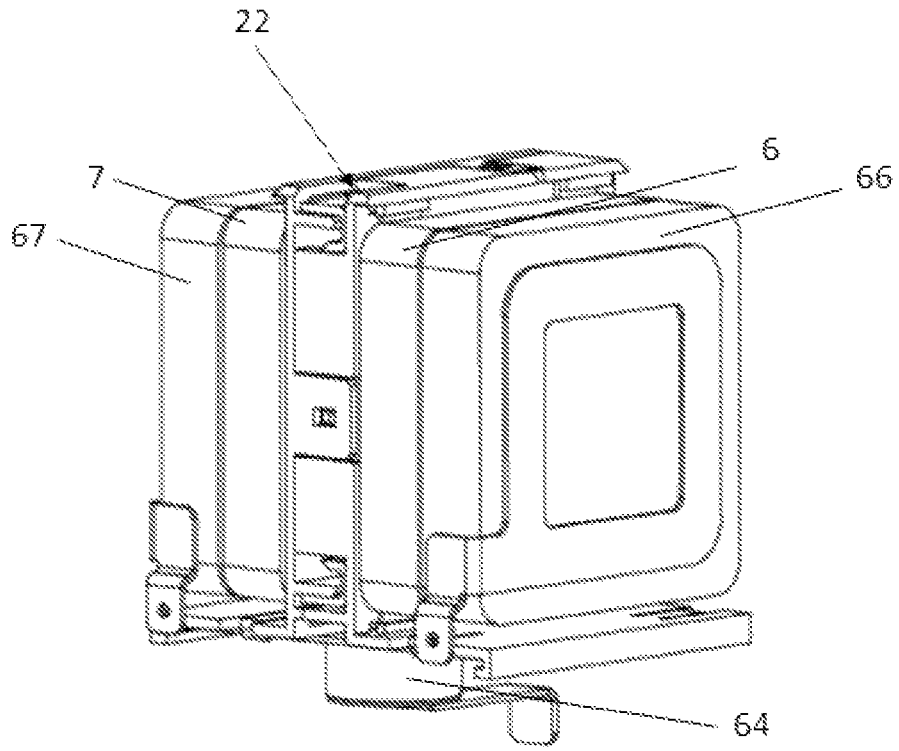

FIG. 15 is a partial perspective view of an overvoltage protection device including an electrical circuit conforming to that represented in FIG. 14.

Figure 16:
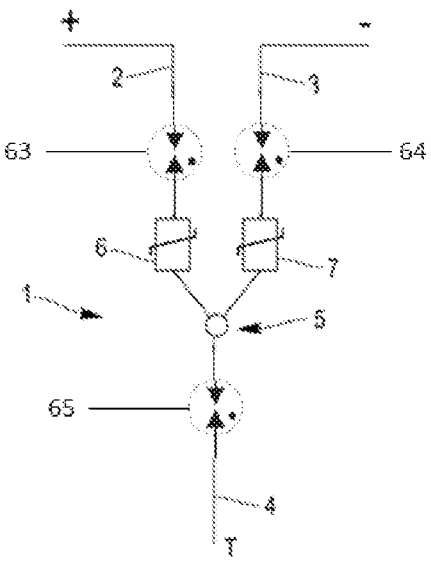

FIG. 16 is a schematic view of an electrical circuit of an overvoltage protection device in accordance with a fifth embodiment.

Figure 17:
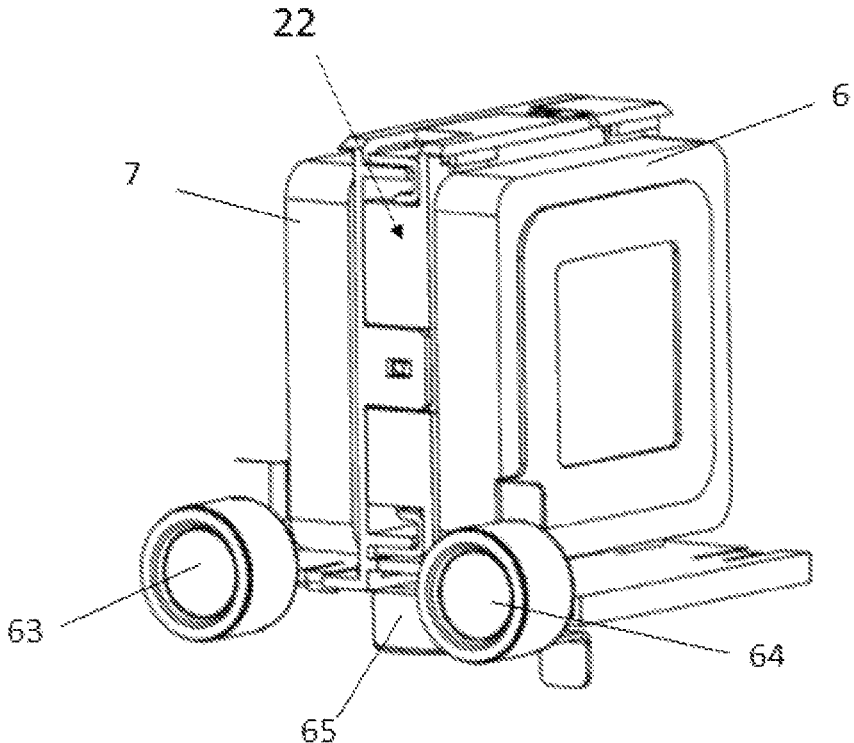

FIG. 17 is a partial perspective view of an overvoltage protection device including an electrical circuit conforming to that represented in FIG. 16.

Figure 18:
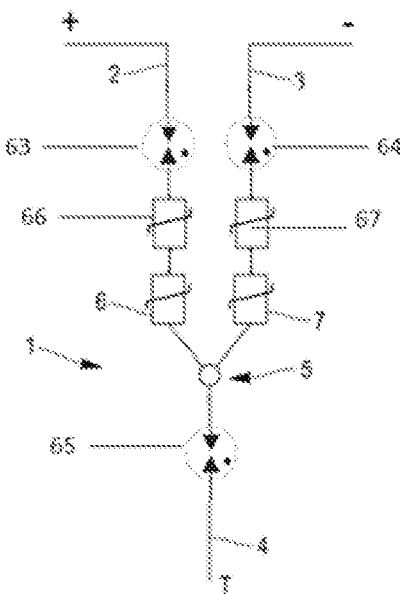

FIG. 18 is a schematic view of an electrical circuit of an overvoltage protection device in accordance with a sixth embodiment.

Figure 19:
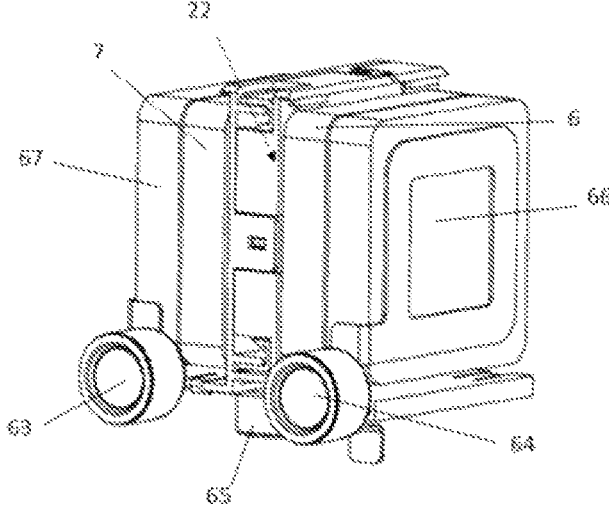

FIG. 19 is a partial perspective view of an overvoltage protection device including an electrical circuit conforming to that represented in FIG. 18.

DETAILED DESCRIPTION

Figure 1:
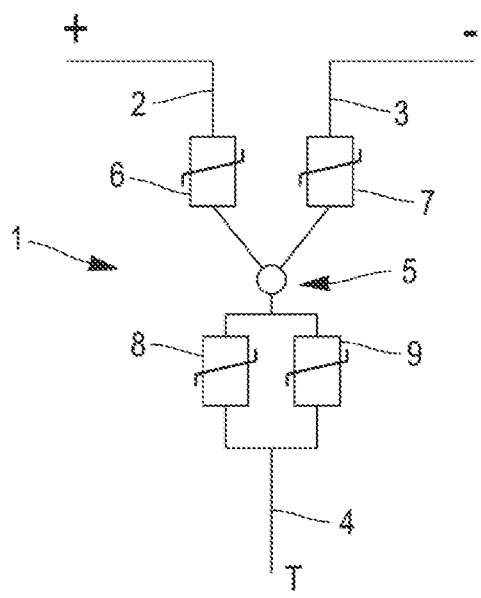
FIG. 1 is a schematic representation of an electrical circuit of an overvoltage protection device.

FIG. 1 is a schematic depiction of an electrical circuit of an overvoltage protection device 1. The protection device 1 is intended to be installed in an electrical installation in parallel with and upstream of the equipment or equipments to be protected. In FIG. 1 the electrical installation is a DC installation and therefore includes a positive line +, a negative line − and an earth line T.

The overvoltage protection device 1 includes three branches, namely a positive branch 2, a negative branch 3 and an earth branch 4 each of which is intended to be connected to one of the aforementioned three lines. The three branches 2, 3, 4 join at a central connection point that is equipped with a heat-sensitive disconnector device 5. An electrical circuit of this kind therefore has a so-called Y configuration. The positive branch 2 and the negative branch 3 are each equipped with a protection element, namely a varistor 6, 7 in the embodiment represented. The earth branch 4, which is connected to the earth line, is also equipped with at least one protection element. In the embodiment depicted in FIG. 1 the earth branch 4 includes two varistors 8, 9 electrically in parallel with one another.

When a varistor 6, 7, 8, 9 is subjected to a voltage below an activation voltage it acts as a high-impedance element so that no current flows through it. To the contrary, if subjected to a voltage above the activation voltage the varistors 6, 7, 8, 9 act as a virtually zero impedance element so as to shunt the overvoltage. A protection device 1 of this kind therefore enables elimination of overvoltages between the positive and negative lines and between one of the positive and negative lines and the earth line.

The electrical circuit and the protection elements 6, 7, 8, 9 are described hereinabove only by way of example and it is obvious that they can vary as a function of the intended application. In particular, in other embodiments one or more of the aforementioned protection elements are types of protection element other than varistors, for example gas-filled spark gaps.

There is described hereinafter with reference to FIGS. 2 to 9 a protection device 1 in accordance with an embodiment corresponding to the electrical circuit depicted schematically in FIG. 1.

Referring to FIG. 2, it is seen that the protection device 1 includes a casing 10 comprising a base 11 and a cap 12 defining between them an internal space in which the components of the protection device 1 are accommodated. The casing 10 is for example made of plastic material. The base 11 is configured to be fixed to a fixing rail, not represented.

Figure 3:
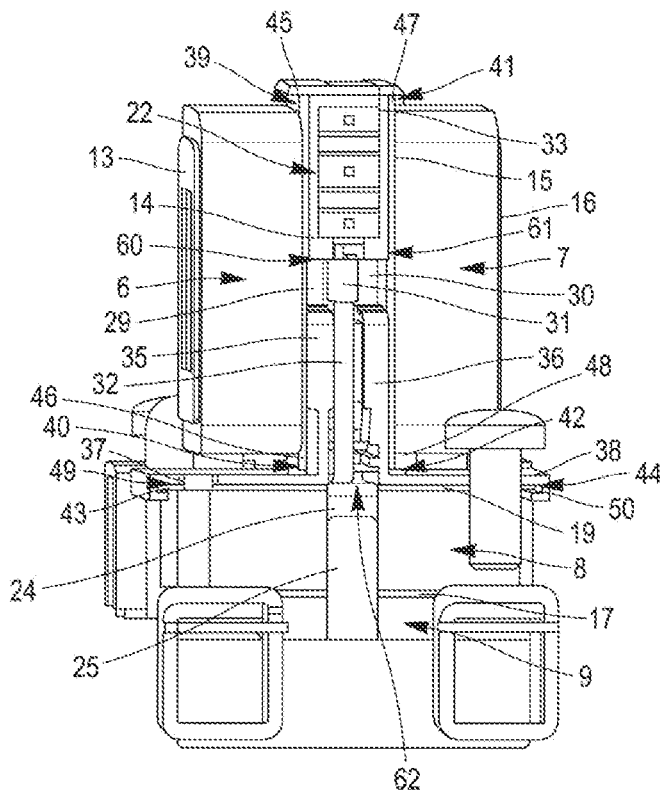
FIG. 3 is a partial perspective view of the overvoltage protection device from FIG. 2.

In the embodiment represented the varistors 6, 7, 8, 9 have a substantially flattened rectangular parallelepipedal shape. Each varistor 6, 7, 8, 9 therefore has two large rectangular faces that are parallel to one another. The varistors 6, 7 of the positive branch 2 and of the negative branch 3 are geometrically disposed parallel to one another. As represented in FIG. 3 the varistors 6, 7 are each equipped with two electrodes 13, 14, 15, 16 that are respectively in contact against one and the other of the large faces of said varistor 6, 7. The electrode 13 of the varistor 6, that is to say the one on the large face opposite the varistor 7, is electrically connected to a positive connecting terminal 20, that is to say one intended to be electrically connected to the positive line + of the electrical installation. Likewise, the electrode 16 of the varistor 7, that is to say the one on the large face opposite the varistor 6, is electrically connected to a negative connecting terminal 21, that is to say the one intended to be electrically connected to the negative line – of the electrical installation. The varistors 6, 7 are spaced from one another by a first gap in which are accommodated the heat-sensitive disconnector device 5 and an arc-extinguishing device 22 to be described hereinafter.

Figure 4:
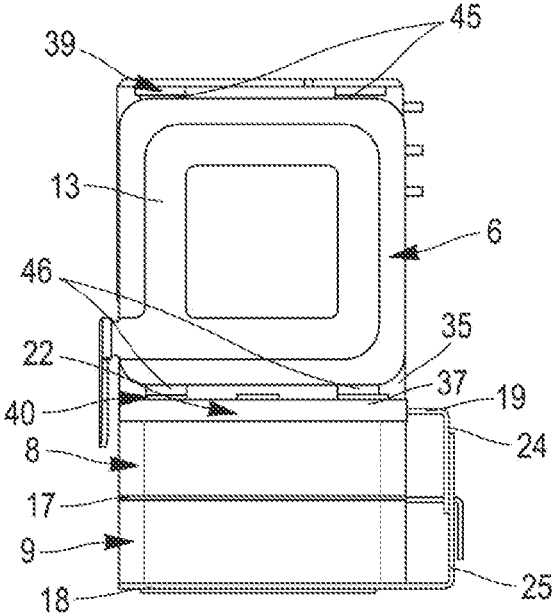
FIG. 4 is a partial side view of the overvoltage protection device from FIG. 2.

The two varistors 8, 9 of the earth branch are parallel to one another and against one another. Furthermore, these two varistors 8, 9 are below and perpendicular to the planes of the varistors 6, 7 of the positive branch 2 and the negative branch 3. The two varistors 8, 9 are spaced from the varistors 6, 7 by a second gap. As the varistors 8, 9 are positioned against one another, an electrode 17 visible in particular in FIG. 4 is advantageously common to the two varistors 8, 9 and positioned between the latter. This electrode 17 is electrically connected to an earth connecting terminal 23, that is to say one intended to be electrically connected to the earth line of the electrical installation.

As represented in FIG. 4 in particular the electrodes 18, 19, that is to say those that cover the large faces of the varistors 8, 9 that are opposite one another, are connected to one another. To this end said electrodes 18, 19 feature bent portions 24, 25. The bent portions extend perpendicularly to the large faces of the varistors 18, 19 and project toward one another. One of the bent portions 24, 25 covers the other one and the bent portions 24, 25 are welded to one another in the overlap zone.

Returning to FIG. 2, it is seen that in the embodiment represented each of the positive connecting terminal 20, negative connecting terminal 21 and earth connecting terminal 23 includes a metal frame 26 that is intended to receive a bared end of a cable of the corresponding line. The connecting terminals 20, 21, 23 each include a screw 27 that is mounted in an internally-threaded bore 28 in the corresponding metal frame 26 and enables the bared end of the corresponding cable to be clamped against the metal frame 26 in order to make an electrical connection.

Figure 5:
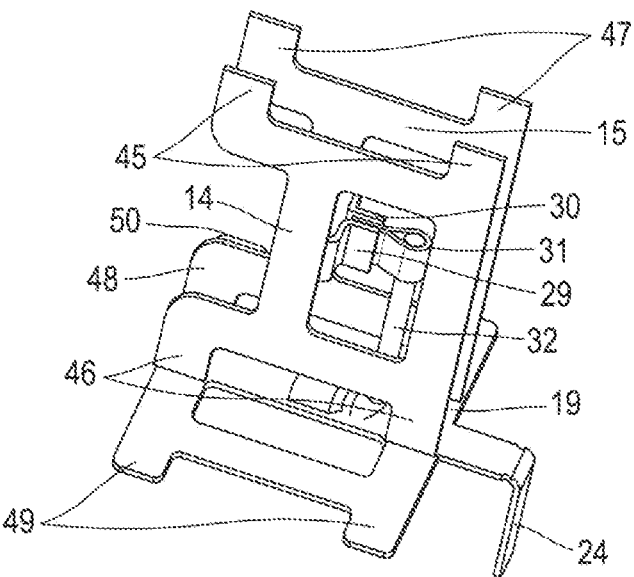
FIG. 5 is a perspective view of the electrodes and the heat-sensitive disconnector device in a connected state which electrically connects three of the varistors of the overvoltage protection device from FIG. 2.

The heat-sensitive disconnector device 5 connecting the positive branch 2, negative branch 3 and earth branch 4 is visible in FIGS. 3 and 5 in particular. In those figures the heat-sensitive disconnector device 5 is represented in the connected state. The electrodes 14, 15 of the varistors 6, 7 each have a lug 29, 30 that projects in the direction of the gap between said varistors 6, 7. The free end of the lugs 29, 30 is bent and oriented parallel to the planes of the varistors 6, 7. A tag 31 is inserted between the lugs 29, 30 and is connected to said lugs 29, 30 by a thermofusible connection. The tag 31 is fixed and electrically connected, for example crimped, to the end of a braided cable 32. The braided cable 32 is welded at its other end to the electrode 19 of the varistor 8. The thermofusible connection is a connection adapted to fail as soon as it is subjected to a temperature greater than or equal to a temperature threshold. This thermofusible connection is made by any means, for example by thermofusible solder. The thermofusible solder includes a tin alloy, for example.

Thus in the event of an overvoltage between the positive and negative lines or between a positive or negative line and the earth line one of the varistors 6, 7 is heated. The heating of the varistors 6, 7 leads to an increase in the temperature of the thermofusible connection. When the thermofusible connection is heated to a temperature greater than its melting point it melts and then no longer fixes the tag 31 to the lugs 29, 30. The tag 31 then escapes from the connection position in which it makes an electrical connection between the positive branch 2, negative branch 3 and earth branch 4 so that the latter are no longer electrically connected to one another. The heat-sensitive disconnector device 5 is then in the disconnected state.

The arc-extinguishing device 22 includes a cassette 33 in which an insulating blade 34 is mobile between a retracted position depicted in FIG. 8 and a deployed position depicted in FIG. 9. As will become apparent on reading the description hereinafter the arc-extinguishing device 22 is particularly advantageous in that it is made in the form of a pre-assembled sub-assembly, which makes it possible to facilitate the manufacture of the protection device 1.

As depicted in FIGS. 3 and 6 for example the cassette 33 includes two lateral walls 35, 36 that are fixed to one another and on respective opposite sides of the insulating blade 34. The lateral walls 35, 36 extend parallel to the planes of the varistors 6, 7 and are inserted in the gap formed between the varistors 6, 7. The cassette 33 also includes two lateral flanges 37, 38 that respectively extend from a lower end of the lateral walls 35, 36 and perpendicular to them. One lateral flange 37 is therefore between the varistor 6 and the varistor 8 while the other lateral flange 38 is between the varistor 7 and the varistor 8.

The cassette 33 is configured to be fixed to the varistors 6, 7 and 8 and therefore provides a function of stiffening the connections between the varistors 6, 7 and 8. To this end the lateral walls 35, 36 and the lateral flanges 37, 38 are equipped with slideways 39, 40, 41, 42, 43, 44 in which the electrodes 14, 15 and 19 are accommodated. To be more specific, as depicted in FIG. 3 for example, the electrodes 14 and 15 of the varistors 6 and 7 include projecting portions 45, 46, 47, 48 that project beyond the body of said varistors 6, 7 along two opposite edges of said varistors 6, 7 and are accommodated in the slideways 39, 40, 41, 42 formed in the lateral walls 35, 36. Likewise, the electrode 19 of the varistor 8 includes projecting portions 49, 50 that project beyond the body of the varistor 8 along two opposite edges of said varistor 8 and are respectively accommodated in the slideways 43, 44 formed in the two lateral flanges 37, 38.

The slideways 39, 40, 41, 42, 43, 44 extend parallel to one another and in directions that are both parallel to the planes of the varistors 6, 7 and to the planes of the varistors 8, 9, which enables the cassette 33 of the arc-extinguishing device 22 to be fixed to the varistors 6, 7, 8 after the latter have been fixed to one another.

Furthermore, the insulating blade 34 is mobile in translation inside the cassette 33 between its retracted position and its deployed position. To this end, as represented in FIG. 5, the insulating blade 34 includes curved flanges 51, 52 that slide in slideways 52, 53 formed inside the cassette 33 on the interior face of one of the lateral walls 36. The insulating blade 34 slides in a direction that is parallel to the directions of the slideways 39, 40, 41, 42, 43, 44 in which the electrodes 14, 15, 19 are accommodated. This enables the insulating blade 34 to be moved toward its retracted position when assembling the arc-extinguishing device 22 with the varistors 6, 7, 8.

Furthermore, the arc-extinguishing device 22 includes at least one return elastic member that is also accommodated inside the cassette 33 and is adapted to urge said insulating blade 34 in the direction of the deployed position. In the embodiment represented the arc-extinguishing device 22 includes two coil springs 54, 55 that are loaded in compression and each of which has an end bearing against a bearing surface of the cassette 33 and an end bearing against a bearing surface of the insulating blade 34. As depicted in FIGS. 7 to 9 the insulating blade 34 advantageously includes centering pins 56, 57 over which the coil springs 54, 55 are threaded and make it possible to prevent the latter from moving off-axis. The centering pins 56, 57 are formed here in grooves formed in the insulating blade 34.

The arc-extinguishing device 22 also includes an abutment 58 visible in FIG. 9 in particular against which the insulating blade 34 comes into contact in the deployed position. An abutment 58 of this kind is in particular advantageous in that it makes it possible to prevent the insulating blade 34 escaping from the cassette 33 before the arc-extinguishing device 22 is assembled with the other components of the protection device 1. The aforementioned abutment 58 is advantageously formed by a two-state switch 59. The switch 59 includes a mobile blade 60 that is configured to be moved when the insulating blade 34 passes from its retracted position to its deployed position and to modify the state of the switch 59. The switch 59 is intended to be electrically connected to a remote indicator device adapted to indicate, for example to a remote monitoring station, that the heat-sensitive disconnector device 5 is in the disconnected state and that the protection device 1 must therefore be replaced.

As depicted in FIGS. 3, 8 and 9 in particular the lateral walls 35, 36 each include a slot 60, 61 through which passes the lug 29, 30 of one of the electrodes 14, 15 while a free space 62 is formed, in the lower part, between the two lateral walls 35, 36, through which the braided cable 32 passes. The slots 60, 61 and the free space 62 mentioned above therefore enable the heat-sensitive disconnector device 5 and more particularly the tag 31 to come to bear against the insulating blade 34 and to push it in the direction of its retracted position when the arc-extinguishing device 22 is assembled with the varistors 6, 7, 8, 9.

When the protection device 1 is in the assembled state and the heat-sensitive disconnector device is in the connected state the insulating blade 34 of the arc-extinguishing device 22 is in contact against the tag 31 and retained in the retracted position by the latter. In the event of heating of one of the varistors 6, 7 leading to melting of the heat-sensitive element the tag 31 escapes from its connecting position in which it makes a connection between the lugs 29, 30 of the varistors 6, 7, leading to the passage of the heat-sensitive disconnector device 5 to the disconnected state. The insulating blade 34 is then free to move toward its deployed position because of the effect of the return force exerted by the coil springs 54, 55. In moving toward its deployed position the insulating blade 34 is then introduced between the lugs 29, 30 and therefore prevents electrical arcing between the latter.

The main steps of the method of assembling the protection device 1 described hereinabove are described in detail next.

In a first stage two sub-assemblies are produced. On the one hand, the varistors 6, 7, 8, 9 are electrically connected to one another and, on the other hand, the arc-extinguishing device 22 is assembled by mounting the insulating blade 34 and the coil springs 54, 55 inside the cassette 33.

In particular, during production of the sub-assembly including the varistors 6, 7, 8 and 9 and the heat-sensitive disconnection device 5 the lugs 29, 30 of the varistors 6, 7 are connected to the tag 31 by a thermofusible connection, for example by means of thermofusible solder.

In a second stage the arc-extinguishing device 22 is assembled with the varistors. To this end the arc-extinguishing device 22 is positioned relative to the varistors 6, 7, 8, 9 in such a manner that the lateral walls 35, 36 of the cassette 33 face the gap between the varistors 6, 7 and each of the lateral flanges 37, 38 faces the gap between one of the varistors 6, 7 and the varistor 8. The arc-extinguishing device 22 is then moved relative to the varistors 6, 7, 8, 9 by a sliding movement in a direction parallel to the planes of the varistors 6, 7 and to the planes of the varistors 8, 9 until a final mounting position is reached. The projecting portions 45, 46, 47, 48, 49, 50 then slide in the slideways 39, 40, 41, 42, 43, 44. During this sliding movement the heat-sensitive disconnector device 5 and more specifically the tag 31 come to bear against the insulating blade 34 and push it in the direction of its retracted position, thus imparting elastic potential energy to the coil springs 54, 55. When the arc-extinguishing device 22 has reached its final mounting position the insulating blade 34 is therefore in its retracted position and the coil springs 54, 55 have stored potential energy enabling return of the insulating blade 34 to its deployed position in which it is situated between the lugs of the varistors 29, 30 as soon as the heat-sensitive disconnector device 5 goes to the disconnected state.

The arc-extinguishing device 22 and the varistors 6, 7, 8, 9 assembled in this way can then be mounted inside the casing 10.

FIGS. 10 and 11 depict an overvoltage protection device in accordance with a second embodiment. This embodiment differs from that described hereinabove with reference to FIGS. 1 to 9 in that the positive branch 2 and the negative branch 3 are each equipped with two protection elements in series, namely a varistor 6, 7 and a gas-filled spark gap 63, 64. An embodiment of this kind is advantageous in that it makes it possible to prevent leakage currents between the positive or negative line and earth and between the positive line and the negative line.

FIGS. 12 and 13 depict an overvoltage protection device in accordance with a third embodiment. This embodiment differs from that described hereinabove with reference to FIGS. 1 to 9 in that the earth branch 4 includes a gas-filled spark gap 65 in place of the two varistors 8, 9 electrically in parallel with one another. This enables reduction of the overall size of the protection device and prevention of leakage currents between the positive or negative line and earth.

FIGS. 14 and 15 depict an overvoltage protection device in accordance with a fourth embodiment. This embodiment differs from that described hereinabove with reference to FIGS. 1 to 9 in that, on the one hand, the positive branch 2 and the negative branch 3 are each equipped with two varistors 6, 7, 66, 67 in series and, on the other hand, the earth branch 4 includes a gas-filled spark gap 65 in place of the two varistors 8, 9 electrically in parallel with one another. The two varistors 6, 7, 66, 67 in series in each of the positive branch 2 and the negative branch 3 make it possible to increase the maximum discharge current that can be evacuated while the gas-filled spark gap 65 in place of the two varistors 8, 9 in parallel makes it possible to reduce the overall size and to prevent leakage currents between the positive or negative line and earth.

FIGS. 16 and 17 depict an overvoltage protection device in accordance with a fifth embodiment. This embodiment differs from that described hereinabove with reference to FIGS. 1 to 9 in that, on the one hand, the positive branch 2 and the negative branch 3 are each equipped with a varistor 6, 7 and a gas-filled spark gap 63, 64 in series and, on the other hand, the earth branch 4 includes a gas-filled spark gap 65 in place of the two varistors 8, 9 electrically in parallel with one another. The varistors 6, 7 and the gas-filled spark gap 63, 64 in series in each of the positive branch 2 and the negative branch 3 make it possible to prevent leakage currents between the positive or negative line and earth and between the positive line and the negative line while the gas-filled spark gap 65 in place of the two varistors 8, 9 in parallel makes it possible to reduce the overall size.

FIGS. 18 and 19 depict an overvoltage protection device in accordance with a sixth embodiment. This embodiment differs from that described hereinabove with reference to FIGS. 1 to 9 in that, on the one hand, the positive branch 2 and the negative branch 3 are each equipped with two varistors 6, 7, 66, 67 and a gas-filled spark gap 63, 64 in series and, on the other hand, the earth branch 4 includes a gas-filled spark gap 65 in place of the two varistors 8, 9 electrically in parallel with one another. The two varistors 6, 7, 66, 67 in series make it possible to increase the maximum discharge current that can be evacuated, the gas-filled spark gap 63, 64 in the positive branch 2 and the negative branch 3 making it possible to prevent leakage currents between the positive or negative line and earth and between the positive line and the negative line while the gas-filled spark gap 65 in place of the two varistors 8, 9 in parallel makes it possible to reduce the overall size.

Although the invention has been described with reference to particular embodiments it is obvious that it is no way limited to them and that it encompasses all technical equivalents of the means described and combinations thereof if they fall within the scope of the invention.

Use of the verb "to include", "to comprise" or conjugate forms thereof does not exclude the presence of elements or steps other than those stated in the claim.

In the claims any reference sign between parentheses should not be interpreted as a limitation of the claim.

We claim:

1. A method of manufacturing an overvoltage protection device (1) including the following steps:

procuring at least one first protection element (6) and one second protection element (7) each including a first electrode (14, 15) and a second electrode (13, 16), electrically connecting the first electrode (14) of the first protection element (6) to the first electrode (15) of the second protection element (7) by means of a heat-sensitive disconnector device (5), the heat-sensitive disconnector device (5) being able to pass, if said heat-sensitive disconnector device (5) is subjected to a temperature above a threshold, from a connected state to a disconnected state in which the first electrode (14) of the first protection element (6) and the first electrode (15) of the second protection element (7) are disconnected from one another, procuring a pre-assembled arc-extinguishing device (22) comprising a cassette (33), an insulating blade (34) mobile inside the cassette (33) between a retracted position and a deployed position, and at least one return elastic element (54, 55) that is adapted to urge said insulating blade (34) relative to the cassette (33) in the direction of the deployed position, the cassette (33) including slideways (39, 40, 41, 42), moving the arc-extinguishing device (22) relative to the first and second protection elements (6, 7) and to the heat-sensitive disconnector device (5) until a final mounting position is reached in which the heat-sensitive disconnector device (5) bears against the insulating blade (34) and pushes said insulating blade (34) in the direction of the retracted position, said insulating blade (34) being, in said final mounting position of the arc-extinguishing device, adapted to be moved relative to the cassette (33) toward the deployed position and to be introduced between the first electrodes (14, 15) of the first and second protection elements (6, 7) when the heat-sensitive disconnector device (5) goes to the disconnected state, during said movement of the arc-extinguishing device (22) relative to the first and second protection elements (6, 7) and to the heat-sensitive disconnector device (5), projecting portions (45, 46, 47, 48) of the first electrode (14) of the first protection element (6) and of the first electrode (15) of the second protection element (7) sliding in the slideways (39, 40, 41, 42) of the cassette (33), mounting in a casing (10) the first protection element (6), the second protection element (7) and the arc-extinguishing device (22) in the final mounting position.

2. The method of manufacture according to claim 1 in which the insulating blade (34) slides inside the cassette (33) between the retracted position and the deployed position in a direction that is parallel to the slideways (39, 40, 41, 42).

3. An overvoltage protection device (1) comprising:
a casing (10),
    at least one first protection element (6) and one second protection element (7) accommodated in the casing (10) and each including a first electrode (14, 15) and a second electrode (13, 16), the first electrode (14) of the first protection element (6) and the first electrode (15) of the second protection element (7) being connected by means of a heat-sensitive disconnector device (5), the heat-sensitive disconnector device (5) being adapted, if said heat-sensitive disconnector device (5) is subjected to a temperature exceeding a threshold, to go from a connected state to a disconnected state in which the first electrode (14) of the first protection element (6) and the first electrode (15) of the second protection element (7) are disconnected from one another,
    a pre-assembled arc-extinguishing device (22) accommodated in the casing (10) and comprising a cassette (33), an insulating blade (34) mobile inside the cassette (33) between a retracted position and a deployed position and at least one return elastic element (54, 55) that is adapted to urge said insulating blade (34) relative to the cassette (33) in the direction of the deployed position, said arc-extinguishing device being positioned relative to the first and second protection elements (6, 7) and to the heat-sensitive disconnector device (5) in such a manner that the insulating blade bears against the heat-sensitive disconnector device (5) and is retained by the latter in the retracted position, said insulating blade being configured to be moved relative to the cassette (33) toward the deployed position and to be introduced between the first electrodes (14, 15) of the first and second protection elements (6, 7) when the heat-sensitive disconnector device (5) goes to the disconnected state, wherein projecting portions (45, 46, 47, 48) of the first electrode (14) of the first protection element (6) and of the first electrode (15) of the second protection element (7) slide into slideways (39, 40, 41, 42) of the cassette (33).

4. The overvoltage protection device (1) according to claim 3 in which the arc-extinguishing device (22) includes an abutment (58) intended to stop the movement of the insulating blade (34) in the deployed position.

5. The overvoltage protection device (1) according to claim 4 in which the abutment (58) is formed by a switch (59) intended to be electrically connected to a remote indicator device.

6. The overvoltage protection device according to claim 3, further comprising a third protection element (8) including a first electrode (19) and a second electrode (17), the first electrode (19) of the third protection element (8) being connected to the first electrode (14) of the first protection element (6) and to the first electrode (15) of the second protection element (7) by the heat-sensitive disconnector device (5).

7. The overvoltage protection device according to claim 6 in which the first protection element and the second protection element are respectively a first varistor (6) and a second varistor (7) extending parallel to one another and in which the third protection element is selected from a third varistor (8) extending perpendicularly to the first and second varistors (6, 7) and a gas-filled spark gap (65).

8. The overvoltage protection device according to claim 6 in which the heat-sensitive disconnector device (5) includes:
    a tag (31) which, in the connected state, is positioned between a first lug (29) that is part of the first electrode (14) of the first protection element (6) and a second lug (30) that is part of the first electrode (15) of the second protection element (16), said tag (31) being connected to the first lug (29) and to the second lug (30) by a thermofusible connection, and
    a braided cable (32) having a first end connected to the tag (31) and a second end electrically connected to the first electrode (19) of the third protection element (8).

9. The overvoltage protection device according to claim 8 in which the cassette (33) includes a first lateral wall (35) and a second lateral wall (36) that are fixed to one another, on respective opposite sides of the insulating blade (34) and positioned in a gap formed between the first protection element (6) and the second protection element (7), the cassette (33) further including a first lateral flange (37) and a second lateral flange (38) that respectively extend from one end of the first lateral wall (35) and of the second lateral wall (36) perpendicularly to the said first and second lateral walls (35, 36), the first lateral flange (37) being positioned between the first protection element (6) and the third protection element (8) and the second lateral flange (38) being positioned between the second protection element (7) and the third protection element (8).

10. The overvoltage protection device according to claim 9 in which the first lateral wall (35) and the second lateral wall (36) each include a slot (60, 61) through which respectively pass the first lug (29) and the second lug (30), the cassette further including a free space (62) between the first lateral wall (35) and the second lateral wall (36) through which the braided cable (32) passes.

11. The overvoltage protection device (1) according to claim 6, further including a fourth protection element (9) that includes a first electrode (18) and a second electrode (17), the first electrode (18) of the fourth protection element (9) being electrically connected to the first electrode of the third protection element.

* * * * *